United States Patent
Hogan

(10) Patent No.: US 8,132,603 B2
(45) Date of Patent: Mar. 13, 2012

(54) WINDSHIELD COVER AND PROTECTOR

(76) Inventor: Jeremy Hogan, Triangle, VA (US)

(*) Notice: Subject to any disclaimer, the term of this patent is extended or adjusted under 35 U.S.C. 154(b) by 10 days.

(21) Appl. No.: 12/782,835

(22) Filed: May 19, 2010

(65) Prior Publication Data

US 2011/0285164 A1  Nov. 24, 2011

(51) Int. Cl.
*B60J 1/20* (2006.01)
*B65D 65/02* (2006.01)

(52) U.S. Cl. .................. 150/168; 160/370.21; 296/95.1

(58) Field of Classification Search ................ 150/166, 150/168, 370.21; 160/370.21; 296/95.1
See application file for complete search history.

(56) References Cited

U.S. PATENT DOCUMENTS

| | | | | | |
|---|---|---|---|---|---|
| 2,489,901 | A | * | 11/1949 | Kocinski | 160/181 |
| 2,624,406 | A | * | 1/1953 | Szychowski et al. | 160/370.21 |
| 3,588,169 | A | * | 6/1971 | Lunt | 296/95.1 |
| 3,749,147 | A | * | 7/1973 | Hess et al. | 160/354 |
| 3,751,100 | A | * | 8/1973 | Keyes | 150/168 |
| 3,964,780 | A | * | 6/1976 | Naidu | 150/168 |
| 4,049,036 | A | * | 9/1977 | Gebhardt | 150/168 |
| 4,406,320 | A | * | 9/1983 | Bingham | 160/370.21 |
| 4,726,406 | A | * | 2/1988 | Weatherspoon | 150/168 |
| 5,292,167 | A | * | 3/1994 | Hellman | 296/95.1 |
| 5,415,214 | A | * | 5/1995 | Bock et al. | 150/168 |
| 5,615,923 | A | | 4/1997 | Madison | |
| 6,513,853 | B2 | | 2/2003 | Langley | |
| 7,431,375 | B1 | | 10/2008 | Julius | |
| 2007/0107858 | A1 | * | 5/2007 | Liung Huang | 160/370.21 |
| 2007/0252406 | A1 | * | 11/2007 | Webber | 296/136.12 |

* cited by examiner

*Primary Examiner* — Sue Weaver
(74) *Attorney, Agent, or Firm* — Jerry D. Haynes; The Law Office of Jerry D. Haynes

(57) ABSTRACT

The present invention relates to a protective cover for a windshield comprising: a top handle, where said top handle extends from both sides of the cover; a bottom handle, where said bottom handle extends from both sides of the cover; straps, where the straps extend from the top handle and the bottom handle; Velcro tips at the tip of each strap; and a magnetic strip, said strip extends across the top edge of the cover. In one embodiment, the straps are elastic and capable of extending lengthwise. The cover may include reinforcement strips extending across the length of the cover and the cover may be made of a Tyvek material. The magnetic strip seals the top edge of the cover to prevent the intrusion of rain or snow.

4 Claims, 1 Drawing Sheet

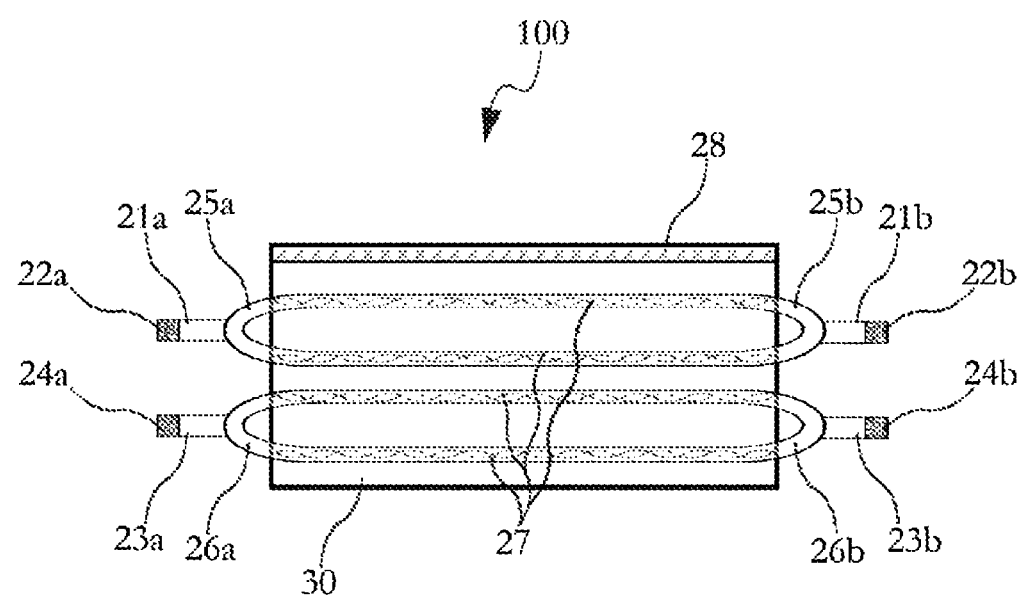

WINDSHIELD COVER AND PROTECTOR

BACKGROUND OF THE INVENTION

1. Field of Invention

The present invention relates to a protective cover for a windshield to prevent ice buildup in a cold climate.

2. Description of Related Art

The windshield covers are commonly used to cover a windshield to protect it from environmental exposure such as snow, rain, frost, ice, or sunlight. Some windshield covers are used on the exterior of the windshield others are placed on the internal dashboard of the windshield that is principally used to prevent the penetration sunlight, ultraviolet rays, into the interior of the vehicle. The covers placed on the exterior of the windshield are particularly designed to prevent frost, snow and ice buildup on the windshield during cold periods or in a cold climate. The covering of the windshield in a cold climate helps to alleviate some of the scraping, cleaning and deicing that would be necessary if the windshield was left open to the environment. Some examples of the windshield covers that have been designed include U.S. Pat. No. 5,615,923 that discloses a windshield protective cover for front and rear, inside or outside vehicle windows, that includes dual sided reflective silver-coated or laminated polyethylene with a fiber inner scrim for strength material that attaches to the vehicle windshields. Another example of a windshield cover is disclosed in U.S. Pat. No. 6,513,853 that discloses a windshield cover having a first panel adapted to overlie the windshield and a cowl of an automobile and a second and third panel adapted to overlie at least the upper portion of the front windows of the automobile, fourth and fifth panels adapted to lie between the front doors and the adjacent cab portion of the automobile when the front doors are in a closed position. The windshield cover of the '853 patent is designed to cover the windshield and yet prevent the theft of the windshield cover when placed over the windshield. Yet another example of a windshield cover is disclosed in U.S. Pat. No. 7,431,375 which discloses a windshield cover that covers the windshield wipers, front window glass portion and passenger side doors on the automobile. The windshield cover of the '375 patent includes numerous attachment means to secure the cover into place.

Further development of windshield covers is needed in order to provide an easy to use and yet effective windshield cover to protect a vehicle windshield during the winter months or in a cold climate. The protection of the windshield helps to alleviate the buildup of frost, snow and ice on the window and alleviates the laborious cleaning of the windshield prior to driving the vehicle.

SUMMARY OF THE INVENTION

The present invention relates to a protective cover for a windshield comprising: a top handle, where said top handle extends from both sides of the cover; a bottom handle, where said bottom handle extends from both sides of the cover; straps, where the straps extend from the top handle and the bottom handle; Velcro tips at the tip of each strap; and a magnetic strip, said strip extends across the top edge of the cover. In one embodiment, the straps are elastic and capable of extending lengthwise. The cover may include reinforcement strips extending across the length of the cover and the cover may be made of a Tyvek material. The magnetic strip seals the top edge of the cover to prevent the intrusion of rain or snow.

BRIEF DESCRIPTION OF DRAWINGS

FIG. 1 depicts a windshield cover according to the present invention.

DETAILED DESCRIPTION

The present invention relates to a windshield cover for a vehicle wherein the windshield cover provides protection for the windshield to prevent the buildup of ice, frost or snow in a cold climate. The present windshield cover uses easily attachable straps and handles to secure the cover onto the windshield and a magnetic strip to seal the upper edge of the windshield cover. The windshield cover according to the present invention also utilizes a Tyvek material that provides a means of insulating the windshield from the cold environment and to prevent the buildup of ice or snow on the windshield.

In reference to FIG. 1, a windshield cover 100 is depicted. The cover 100 includes four elastic straps 21a, 21b that extend from the top handles 25a, 25b and straps 23a, 23b that extend from the bottom handles 26a, 26b. The handles 25a, 25b and 26a, 26b extend from the sides of the cover 100. The straps that extend from the respective handles provide a means to secure the windshield cover 100 into place over a front windshield of a vehicle. The straps include Velcro tips 22a, 22b, 24a, 24b that are stretched due to the elasticity of the straps and connect with each other respectively on the interior of the windshield. When placed over the windshield Velcro tips 22a, 22b attach to one another and Velcro tips 24a, 24b attach to each other. The elasticity of the straps 21a, 21b, 23a, 23b provide a flexible means to extend the straps to join the Velcro tips to secure the windshield cover 100 over the windshield.

Other features of the windshield cover 100 includes the cover portion 30 that includes a magnetic strip 28 extending across the top edge thereof. The magnetic strip 28 provides a means to seal the top edge of the windshield cover 100 in order to prevent the seepage of moisture into the top edge of the cover 30. On the interior of the cover 30, reinforcement strips 27 are provided to further reinforce the overall structure of the cover 30 as it is stretched across the windshield.

The cover 30 is comprised of a Tyvek material that provides an insulation means to protect the windshield. The insulation of the windshield helps to prevent the buildup of ice due to frigid conditions. Further the covering of the windshield prevents the buildup of snow, rain or other precipitation that may occur in a cold climate.

The windshield cover 100 according to the present invention is a device that is easily attaches to the outside surface of a windshield and it is secured on the interior of the windshield through the use the elastic straps and Velcro tips. The material used to make the cover helps to shield the windshield from the cold environment and keeps the windshield clear for the user thereof. The use of the windshield cover obviates the need to engage in defrosting of the windshield or scraping the windshield due to the weather conditions. The instant invention has been shown and described in what it considers to be the most practical and preferred embodiments. It is recognized, however, that departures may be made there from within the scope of the invention and that obvious modifications will occur to a person skilled in the art.

What is claimed is:

1. A protective cover for a windshield comprising:
   a. a top handle, where said top handle extends from both sides of the cover;

b. a bottom handle, where said bottom handle extends from both sides of the cover;

c. straps, where the straps extend from the top handle and the bottom handle;

d. hook and loop fastener tips at the tip of each strap, where the hook and loop fastener tips connect to each other on the interior of the windshield;

e. reinforcement strips extending across the length of the cover; and f. a magnetic strip, where said strip extends across the top edge of the cover.

2. The protective cover according to claim 1, where the straps are elastic and capable of extending lengthwise.

3. The protective cover according to claim 1, where the cover is made of a spun bonded olefin material.

4. The protective cover according to claim 1, where the magnetic strip seals the top edge of the cover.

* * * * *